US012027028B2

(12) United States Patent
Hevdeli et al.

(10) Patent No.: US 12,027,028 B2
(45) Date of Patent: Jul. 2, 2024

(54) CONTROLLING FRAME RATE OF ACTIVE REFLECTED WAVE DETECTOR

(71) Applicant: Essence Smartcare Ltd., Herzlia Pituach (IL)

(72) Inventors: Ilan Hevdeli, Ganei-Tikva (IL); Boaz Menis, Kibbutz NaAn (IL)

(73) Assignee: Essence Smartcare Ltd., Herzlia Pituach (IL)

( * ) Notice: Subject to any disclaimer, the term of this patent is extended or adjusted under 35 U.S.C. 154(b) by 0 days.

(21) Appl. No.: 18/008,017

(22) PCT Filed: Jun. 3, 2021

(86) PCT No.: PCT/IL2021/050664
§ 371 (c)(1),
(2) Date: Dec. 2, 2022

(87) PCT Pub. No.: WO2021/245673
PCT Pub. Date: Dec. 9, 2021

(65) Prior Publication Data
US 2023/0196896 A1 Jun. 22, 2023

(30) Foreign Application Priority Data

Jun. 3, 2020 (GB) ..................................... 2008326

(51) Int. Cl.
*G08B 21/00* (2006.01)
*G01S 7/41* (2006.01)
(Continued)

(52) U.S. Cl.
CPC .......... *G08B 21/0469* (2013.01); *G01S 7/415* (2013.01); *G01S 13/89* (2013.01)

(58) Field of Classification Search
USPC ....................................................... 356/4.01
See application file for complete search history.

(56) References Cited

U.S. PATENT DOCUMENTS 4,882,567 A 11/1989 Johnson
6,445,409 B1* 9/2002 Ito ..................... G08B 13/1961
348/E7.086
(Continued)

FOREIGN PATENT DOCUMENTS

CN 1670780 A 9/2005
CN 108806190 A 11/2018
(Continued)

OTHER PUBLICATIONS

Foreign Communication from a Related Counterpart Application, International Preliminary Report on Patentability dated Dec. 6, 2022, International Application No. PCT/IL2021/050664 filed on Jun. 3, 2021.

(Continued)

*Primary Examiner* — James R Hulka
(74) *Attorney, Agent, or Firm* — Conley Rose P.C.

(57) ABSTRACT

A method comprising: controlling an active reflected wave detector to measure wave reflections from an environment using a first frame rate to accrue measured wave reflection data for a classifier, after a first amount of time, determining whether a predefined criteria is satisfied, wherein satisfaction of the predefined criteria is indicative of the classifier being likely to successfully identify a fall status of a person in the environment by a second amount of time of accruing measured wave reflection data from the active reflected wave detector, the second amount of time being greater than the first amount of time; in the event that the predefined criteria is not met, the method comprising controlling the active reflected wave detector to accrue measured wave reflection data at a lower second frame rate for classifying the fall status based on measured wave reflection data accrued at the lower second rate.

20 Claims, 5 Drawing Sheets

(51) Int. Cl.
  *G01S 13/89* (2006.01)
  *G08B 21/04* (2006.01)

(56) References Cited

U.S. PATENT DOCUMENTS

| | | | |
|---|---|---|---|
| 7,567,200 | B1 | 7/2009 | Osterweil |
| 7,893,844 | B2 | 2/2011 | Gottlieb |
| 7,916,066 | B1 | 3/2011 | Osterweil |
| 8,068,051 | B1 | 11/2011 | Osterweil |
| 8,742,935 | B2 * | 6/2014 | Cuddihy ............ G08B 21/0469 340/573.7 |
| 9,568,594 | B2 * | 2/2017 | Harash ..................... G01S 13/89 |
| 10,380,860 | B2 | 8/2019 | Amir et al. |
| 2005/0285941 | A1 | 12/2005 | Haigh et al. |
| 2006/0145874 | A1 | 7/2006 | Fredriksson et al. |
| 2011/0032139 | A1 | 2/2011 | Benitez et al. |
| 2012/0116252 | A1 | 5/2012 | Newman et al. |
| 2013/0002434 | A1 | 1/2013 | Cuddihy et al. |
| 2013/0041856 | A1 | 2/2013 | Benitez et al. |
| 2013/0082842 | A1 | 4/2013 | Balazs et al. |
| 2014/0145848 | A1 | 5/2014 | Amir |
| 2014/0155729 | A1 | 6/2014 | Saitoh |
| 2014/0266860 | A1 | 9/2014 | Blumrosen et al. |
| 2014/0362213 | A1 | 12/2014 | Tseng |
| 2016/0267327 | A1 | 9/2016 | Franz et al. |
| 2016/0377704 | A1 | 12/2016 | Harash et al. |
| 2017/0074980 | A1 | 3/2017 | Adib et al. |
| 2017/0169691 | A1 | 6/2017 | Kirenko et al. |
| 2017/0328995 | A1 | 11/2017 | Marschalkowski et al. |
| 2018/0070889 | A1 | 3/2018 | Lee et al. |
| 2018/0192919 | A1 | 7/2018 | Nakayama et al. |
| 2018/0330593 | A1 | 11/2018 | Zack et al. |
| 2019/0108740 | A1 | 4/2019 | Coke et al. |
| 2019/0108913 | A1 | 4/2019 | Coke et al. |
| 2019/0110741 | A1 | 4/2019 | Ishii et al. |
| 2019/0313948 | A1 | 10/2019 | Matsunaga et al. |
| 2020/0116824 | A1 | 4/2020 | Yang et al. |
| 2021/0398666 | A1 | 12/2021 | Maslik et al. |
| 2023/0039666 | A1 * | 2/2023 | Hevdeli .................. G01P 13/00 |
| 2023/0042452 | A1 * | 2/2023 | Amir ....................... G01S 13/56 |
| 2023/0055654 | A1 * | 2/2023 | Amir ....................... G01S 7/412 |

FOREIGN PATENT DOCUMENTS

| | | | | |
|---|---|---|---|---|
| CN | 109239706 | A | | 1/2019 |
| CN | 109765552 | A | | 5/2019 |
| CN | 110179471 | A | | 8/2019 |
| CN | 110703241 | A | | 1/2020 |
| CN | 111166342 | A | | 5/2020 |
| CN | 112363160 | A | | 2/2021 |
| EP | 0367402 | A1 | | 5/1990 |
| EP | 2533219 | A1 | | 12/2012 |
| EP | 2875500 | A1 | | 5/2015 |
| JP | 2006153878 | A | | 6/2006 |
| JP | 2008220250 | A | | 9/2008 |
| JP | 2015082265 | A | | 4/2015 |
| WO | 2012002904 | A1 | | 1/2012 |
| WO | 2016155789 | A1 | | 10/2016 |
| WO | 2016193972 | A2 | | 12/2016 |
| WO | 2018037041 | A1 | | 3/2018 |
| WO | 2019070570 | A1 | | 4/2019 |
| WO | 2019231861 | A1 | | 12/2019 |
| WO | 2021118570 | A1 | | 6/2021 |
| WO | 2021137215 | A1 | | 7/2021 |
| WO | 2021137220 | A1 | | 7/2021 |
| WO | 2021137227 | A2 | | 7/2021 |
| WO | WO-2021137215 | A1 * | 7/2021 | .............. G01P 13/00 |
| WO | WO-2021137220 | A2 * | 7/2021 | ........... G01B 15/025 |
| WO | WO-2021137227 | A2 * | 7/2021 | .............. G01P 13/00 |
| WO | 2021245673 | A1 | | 12/2021 |
| WO | WO-2023026288 | A1 * | 3/2023 | |

OTHER PUBLICATIONS

Foreign Communication from a Related Counterpart Application, International Search Report and Written Opinion dated Oct. 6, 2021, International Application No. PCT/IL2021/050664 filed on Jun. 3, 2021.

Foreign Communication from a Related Counterpart Application, United Kingdom Search Report dated Dec. 2, 2020, United Kingdom Application No. 2008326.7 filed on Jun. 3, 2020.

Foreign Communication from a Related Counterpart Application, International Combined Search and Examination Report dated Sep. 13, 2021, Great Britain Application No. 2110780.0 filed on Jul. 27, 2021.

Foreign Communication from a Related Counterpart Application, International Search Report and Written Opinion dated Jun. 28, 2021, International Application No. PCT/IL2020/051345 filed on Dec. 29, 2020.

Foreign Communication from a Related Counterpart Application, Examination Report dated Oct. 29, 2021, Great Britain Application No. 2110780.0 filed on Jul. 27, 2021.

Foreign Communication from a Related Counterpart Application, International Combined Search and Examination Report dated Jun. 23, 2020, Great Britain Application No. 1919446.3 filed on Dec. 31, 2019.

Foreign Communication from a Related Counterpart Application, International Preliminary Report on Patentability dated Jul. 5, 2022, International Application No. PCT/IL2020/051353 filed on Dec. 30, 2020.

Foreign Communication from a Related Counterpart Application, International Combined Search and Examination Report dated Jun. 23, 2020, Great Britain Application No. 1919449.7 filed on Dec. 31, 2019.

Foreign Communication from a Related Counterpart Application, International Preliminary Report on Patentability dated Jul. 5, 2022, International Application No. PCT/IL2020/051345 filed on Dec. 29, 2020.

Foreign Communication from a Related Counterpart Application, International Combined Search and Examination Report dated Jun. 25, 2020, Great Britain Application No. 1919450.5 filed on Dec. 31, 2019.

Foreign Communication from a Related Counterpart Application, International Search Report and Written Opinion dated Aug. 3, 2021, International Application No. PCT/IL2020/051353 filed on Dec. 30, 2020.

Foreign Communication from a Related Counterpart Application, International Preliminary Report on Patentability dated Jul. 5, 2022, International Application No. PCT/IL2020/051336 filed on Dec. 28, 2020.

Foreign Communication from a Related Counterpart Application, International Search Report and Written Opinion dated Apr. 16, 2021, International Application No. PCT/IL2020/051336 filed on Dec. 28, 2020.

A Patentseekers Patentability Search Report that was prepared for UK application GB1919449.7 which corresponds to U.S. Appl. No. 17/790,491.

* cited by examiner

CONTROLLING FRAME RATE OF ACTIVE REFLECTED WAVE DETECTOR

CROSS-REFERENCE TO RELATED APPLICATIONS

The present application is a filing under 35 U.S.C. 371 as the National Stage of International Application No. PCT/IL2021/050664, filed Jun. 3, 2021, entitled "CONTROLLING FRAME RATE OF ACTIVE REFLECTED WAVE DETECTOR", which claims priority to United Kingdom Application No. 2008326.7 filed with the Intellectual Property Office of the United Kingdom on Jun. 3, 2020, both of which are incorporated herein by reference in their entirety for all purposes.

TECHNICAL FIELD

The present invention relates generally to a device and method for determining a state of a person in an environment.

BACKGROUND

There is a need to use a monitoring system to automatically detect a state of a person in a designated space, for example in an interior of a building. For example, an elderly person may end up in a hazardous situation in which they are unable to call for help, or unable to do so quickly. One such situation may be if they have fallen.

Some known systems have been developed in which the person wears a pendant which has an accelerometer in it to detect a fall based on kinematics. The pendant upon detecting a fall can transmit an alert signal. However the person may not want to wear, or may be in any case not wearing, the pendant.

Other reflected-wave based systems such as radar (whether radio wave, microwave or millimeter wave), lidar or sonar, are known to monitor a person in a designated space.

SUMMARY

The inventors have identified that the known reflected-wave based systems consume significant power, which presents a challenge to its viability in applications in which low power consumption is a key requirement.

In particular, embodiments of the present disclosure advantageously minimize power consumption by classifying the person's state as soon as possible.

In embodiments of the present disclosure, an active reflected wave detector e.g. a radar sensor, is controlled to perform a series of time-spaced reflected wave measurements. Each reflected wave measurement includes a set of one or more measurement points that make up a "point cloud", the measurement points represent reflections from respective reflection points in the environment. To ensure accurate classification by a classifier of a state of a person in an environment it is desirable to maximise the amount of measurement points (also referred to herein as detections). This can be achieved by controlling the frame rate at which the active reflected wave detector accrues measured wave reflection data.

The inventors have identified that testing both frame rates at the time of use to see which results in more detections incurs time and associated power resource which is undesirable.

According to one aspect of the present disclosure there is provided a computer implemented method comprising: controlling an active reflected wave detector to measure wave reflections from an environment using a first frame rate to accrue measured wave reflection data for a classifier, after a first amount of time of accruing measured wave reflection data from the active reflected wave detector, determining whether a predefined criteria based on the measured wave reflection data is satisfied, wherein satisfaction of the predefined criteria is indicative of the classifier being likely to successfully identify a fall status of a person in the environment by a second amount of time of accruing measured wave reflection data from the active reflected wave detector, the second amount of time being greater than the first amount of time; in the event that the predefined criteria is not met, the method comprising controlling the active reflected wave detector to accrue measured wave reflection data at a lower second frame rate for classifying the fall status based on measured wave reflection data accrued at the lower second frame rate.

It is advantageous to use the faster frame rate first because collecting the same number of frames at a faster frame rate, compared with a slower frame rate, will consume less power, since the overall time that the active reflected wave detector needs to operate is less. Thus if a person in the environment can be detected when the active reflected wave detector is operating at the faster frame rate, power will be saved because scanning at the slower frame rate can be aborted. In embodiments of the present disclosure, time is not wasted checking the lower frame rate. Testing the slower frame rate first may not inform whether the faster frame rate would have worked. Using more measurements, which may occur at the faster frame rate, thereby makes the classification more reliable.

The method may further comprise: tracking an object based on measured wave reflection data accrued at the lower frame rate; and if said tracking does not meet a predefined performance metric by a third amount of time, that is less than the second amount of time, deactivating the active reflected wave detector prior to elapsing of the second amount of time.

The method may further comprise classifying the fall status based on measured wave reflection data accrued at the lower second frame rate.

In the event that the predefined criteria is met, the method may further comprise maintaining the active reflected wave detector to measure wave reflections from the environment using the first frame rate for classifying the fall status based on measured wave reflection data accrued at the first frame rate.

The method may further comprise: tracking an object based on measured wave reflection data accrued at the first frame rate; and if said tracking does not meet a predefined performance metric by a third amount of time, that is less than the second amount of time, deactivating the active reflected wave detector prior to elapsing of the second amount of time.

The method may further comprise classifying the fall status based on measured wave reflection data accrued at the first frame rate.

In some embodiments, classifying the fall status based on measured wave reflection data is only performed if the tracking meets the predefined performance metric.

The method may further comprise: receiving an output of an activity sensor to monitor said environment; commencing a time window after the activity sensor detects activity in said environment; wherein said controlling the active reflected wave detector to measure wave reflections from the environment using the first frame rate is performed upon expiry of the time window, wherein the method comprises delaying expiry of the time window in response to the activity sensor detecting activity in said environment during the time window.

The active reflected wave detector may consume more power in an activated state than the activity sensor in an activated state.

The activity sensor may be a motion detector. The motion detector may be a passive infrared detector. At the first frame rate the active reflected wave detector may be operable to measure wave reflections from a person moving in the environment at a velocity within a velocity range having a lower bound velocity value and an upper bound velocity value, wherein the upper bound velocity value has a magnitude that is greater than a magnitude that of a minimum velocity detectable by the motion detector.

Classifying the fall status of the person may comprise classifying the person as being in a fall state or a non-fall state.

The predefined criteria may be that a tracking algorithm is able to track a potentially human object based on the measured wave reflection data with said tracking meeting a predefined performance metric.

The predefined criteria may relate to a predefined metric derived from the measured wave reflection data.

In one example the predefined metric derived from the measured wave reflection data is, or is based on, at least one count of measured wave reflections accrued during the first amount of time.

The predefined criteria indicative of the classifier being likely to successfully identify a fall status of the person by a second amount of time of data accrual may comprise at least one of: that a count of measured wave reflections accrued over the first amount of time exceeds a first predetermined number; and that there are at least a predetermined minimum number of frames during the first amount of time that each have counts of measured wave reflections that exceed a second predetermined number.

The predefined metric derived from the measured wave reflection data may be a classification performance metric. In such embodiments, the predefined criteria indicative of the classifier being likely to successfully identify a fall status of the person by a second amount of time of data accrual is that the classification performance metric exceeds a classification performance threshold.

The first frame rate may be in a range of 1.6 to 2.4 frames per second (FPS), for example the first frame rate may be 2 FPS.

The lower second frame rate may be in a range of 0.56 to 0.84 FPS, for example, the lower second frame rate may be 0.7 FPS.

The first amount of time may be in a range of 1.5 to 2.5 seconds, for example the first amount of time 2 seconds.

The classifying may be based on measured wave reflection data accrued, in part, during the first amount of time.

In exemplary embodiments described herein, the measured wave reflection data represents reflections from only moving reflection points in the environment.

The active reflected wave detector may be a radar sensor or a sonar sensor.

The first frame rate may have a lower velocity cutoff of 5 mm/sec.

According to another aspect of the present disclosure there is provided a computer-readable storage medium comprising instructions which, when executed by a processor cause the processor to perform the method steps of one or more embodiments described herein.

The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing chip and/or separate to the chip. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

According to one aspect of the present disclosure there is provided a device comprising a processor, wherein the processor is configured to: control an active reflected wave detector to measure wave reflections from an environment using a first frame rate to accrue measured wave reflection data for a classifier, after a first amount of time of accruing measured wave reflection data from the active reflected wave detector, determine whether a predefined criteria based on the measured wave reflection data is satisfied, wherein satisfaction of the predefined criteria is indicative of the classifier being likely to successfully identify a fall status of a person in the environment by a second amount of time of accruing measured wave reflection data from the active reflected wave detector, the second amount of time being greater than the first amount of time; in the event that the predefined criteria is not met, the processor configured to control the active reflected wave detector to accrue measured wave reflection data at a lower second frame rate for classifying the fall status based on measured wave reflection data accrued at the lower second frame rate.

The processor may be configured to perform any of the methods described herein.

The device may further comprise the active reflected wave detector.

In embodiments described herein whereby the processor is configured to perform method steps using the activity sensor, the device may further comprise the activity sensor.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE SEVERAL VIEWS OF THE DRAWINGS

For a better understanding of the present disclosure and to show how embodiments may be put into effect, reference is made to the accompanying drawings in which.

DETAILED DESCRIPTION

Figure 1:
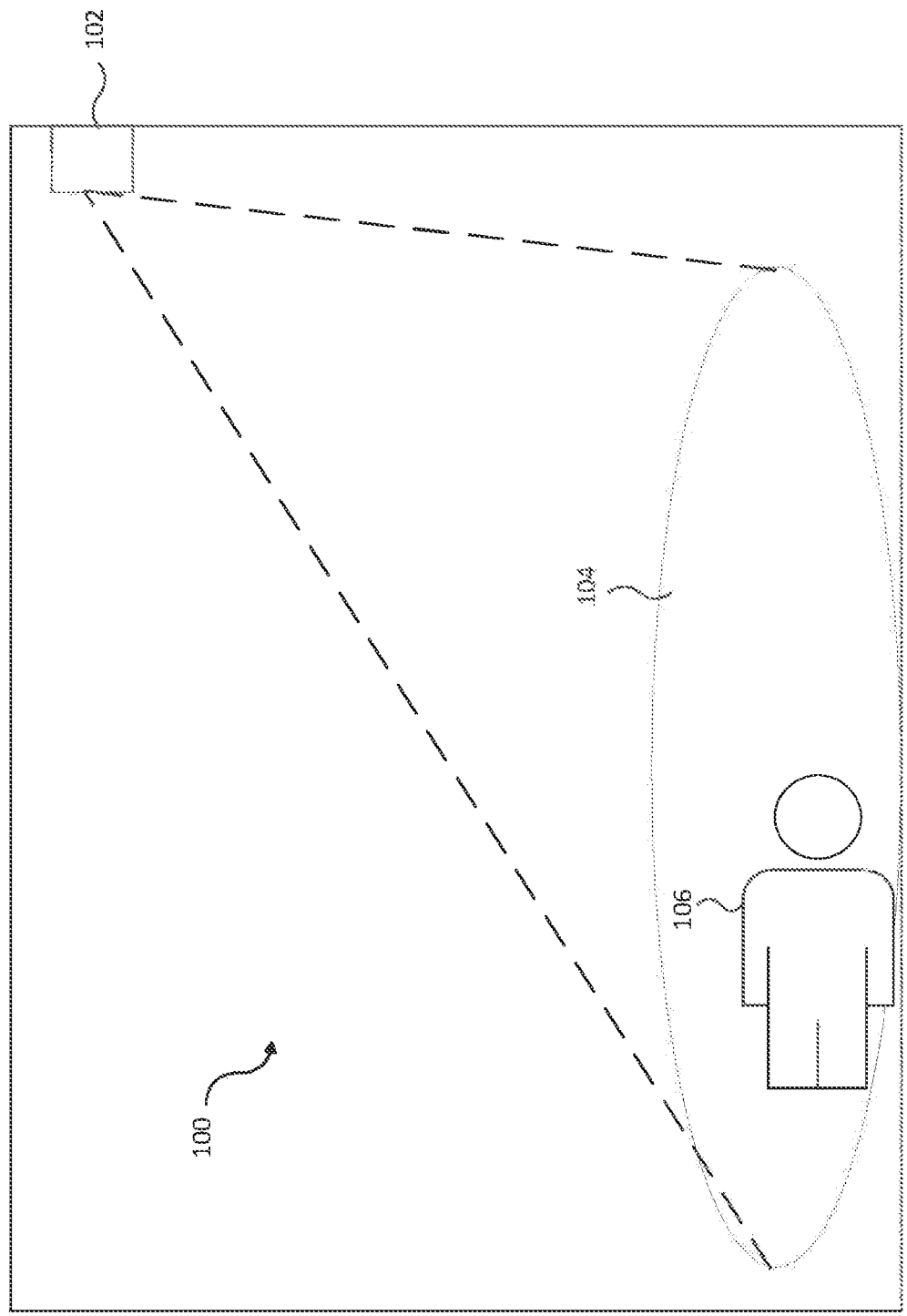
FIG. 1 illustrates an environment in which a device has been positioned.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents. In the following embodiments, like components are labelled with like reference numerals.

In the following embodiments, the term data store or memory is intended to encompass any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., EEPROM, solid state drives, random-access memory (RAM), etc.), and/or the like.

As used herein, except wherein the context requires otherwise, the terms "comprises", "includes", "has" and grammatical variants of these terms, are not intended to be exhaustive. They are intended to allow for the possibility of further additives, components, integers or steps.

The functions or algorithms described herein are implemented in hardware, software or a combination of software and hardware in one or more embodiments. The software comprises computer executable instructions stored on computer readable carrier media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor.

Specific embodiments will now be described with reference to the drawings.

FIG. 1 illustrates an environment 100 in which a device 102 has been positioned. The environment 100 may for example be an indoor space such as a room of a home, a nursing home, a public building or other indoor space. Alternatively the environment may be an outdoor space such as a garden. The device 102 is configured to monitor a space 104 in the environment 100 in which a person 106 may be present.

An embodiment of the present invention relates to the detection of a person 106 having fallen, or at least being in a fall position, which is illustrated in FIG. 1.

Figure 2:
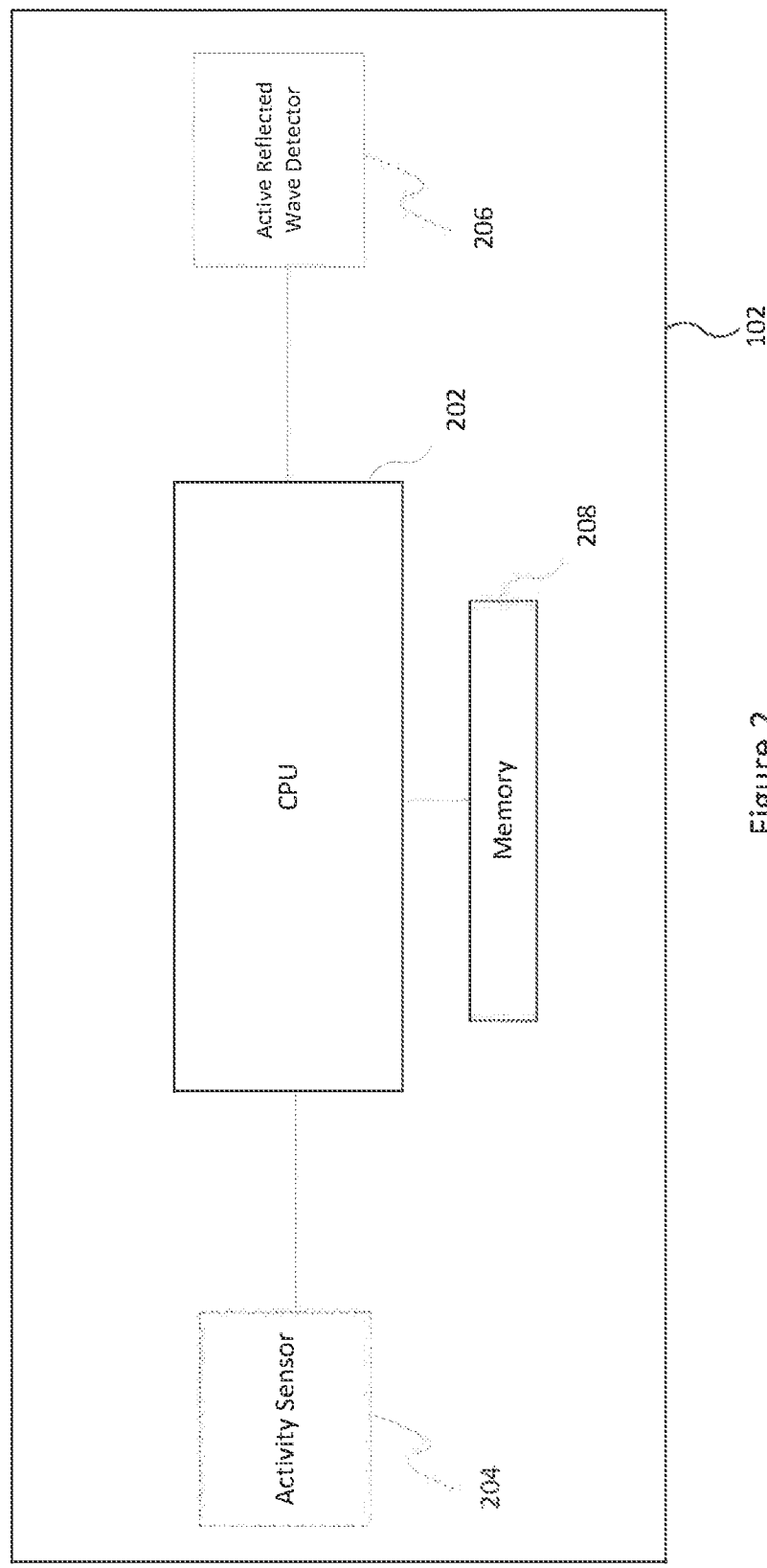
FIG. 2 is a schematic block diagram of the device.

FIG. 2 illustrates a simplified view of the device 102. A shown in FIG. 2, the device 102 comprises a central processing unit ("CPU") 202, to which is connected a memory 208. The functionality of the CPU 202 described herein may be implemented in code (software) stored on a memory (e.g. memory 208) comprising one or more storage media, and arranged for execution on a processor comprising on or more processing units. The storage media may be integrated into and/or separate from the CPU 202. The code is configured so as when fetched from the memory and executed on the processor to perform operations in line with embodiments discussed herein. Alternatively it is not excluded that some or all of the functionality of the CPU 202 is implemented in dedicated hardware circuitry, or configurable hardware circuitry like an FPGA. In other embodiments (not shown) the processor that executes the processing steps described herein may be comprised of distributed processing devices.

FIG. 2 shows the CPU 202 being connected to an activity sensor 204 and an active reflected wave detector 206. While in the illustrated embodiment the activity sensor 204 and reflected wave detector are separate from the CPU 202, in other embodiments, at least part of processing aspects of the activity sensor 204 and/or active reflected wave detector 206 may be provided by a processor that also provides the CPU 202, and resources of the processor may be shared to provide the functions of the CPU 202 and the processing aspects activity sensor 204 and/or active reflected wave detector 206. Similarly, functions of the CPU 202, such as those described herein, may be performed in the activity sensor 204 and/or the active reflected wave detector 206. It will be appreciated from the below that in some embodiments, the activity sensor 204 may not be present. In embodiments where the device 102 comprises the activity sensor 204, the active reflected wave detector 206 may consume more power in an activated state (i.e. when turned on and operational) than the activity sensor 204 does when in an activated state.

As shown in FIG. 2, the device 102 may house both the activity sensor 204 and the active reflected wave detector 206. Alternatively, the activity sensor 204 may be external to the device 102 and be coupled to the CPU 202 by way of a wired or wireless connection. Similarly, the active reflected wave detector 206 may be external to the device 102 and be coupled to the CPU 202 by way of a wired or wireless connection. Further, the outputs of the activity sensor 204 and/or active reflected wave detector 206 may be wirelessly received from via an intermediary device that relays, manipulates and/or in part produces their outputs, for example a control hub of a monitoring and/or home automation system, which may in some cases comprise a security system.

In some embodiments, the CPU 202 is configured to detect activity in the monitored space 104 based on an output of the activity sensor 204. The activity sensor 204 may comprise a motion sensor such as a passive infrared (PIR) sensor. The output from the PIR sensor may be analysed in the CPU to detect motion, or the activity sensor 204 may itself be the motion detector. The motion detector is preferably a PIR detector, however it could be an active reflected wave sensor, for example radar, that detects motion based on the Doppler effect. For example, the activity sensor 204 may be a radar based motion detector which detects motion based on the Doppler component of a radar signal. The activity sensor 204 is not limited to being a motion detector, and in some embodiments may detect activity in the monitored space 104 by way of vibration detection or sound detection.

In some embodiments, the CPU 202 is configured to detect the presence of a person in the monitored space 104, and if a person is present, classify the state of the person based on an output of the active reflected wave detector 206.

The active reflected wave detector 206 may operate in accordance with one of various reflected wave technologies.

Preferably, the active reflected wave detector 206 is a radar sensor. The radar sensor 206 may use millimeter wave (mmWave) sensing technology. The radar is, in some embodiments, a continuous-wave radar, such as frequency modulated continuous wave (FMCW) technology. Such a chip with such technology may be, for example, Texas Instruments Inc. part number IWR6843. The radar may operate in microwave frequencies, e.g. in some embodiments a carrier wave in the range of 1-100 GHz (76-81 Ghz or 57-64 GHz in some embodiments), and/or radio waves in the 300 MHz to 300 GHz range, and/or millimeter waves in the 30 GHz to 300 GHz range. In some embodiments, the radar has a bandwidth of at least 1 GHz. The active reflected wave detector 206 may comprise antennas for both emitting waves and for receiving reflections of the emitted waves, and in some embodiment different antennas may be used for the emitting compared with the receiving.

The active reflected wave detector 206 is not limited to being a radar sensor, and in other embodiments, the active reflected wave detector 206 is a lidar sensor, or a sonar sensor.

The active reflected wave detector 206 being a radar sensor is advantageous over other reflected wave technologies in that radar signals can transmit through some materials, e.g. wood or plastic, but not others—notably water which is important because humans are mostly water. This means that the radar can potentially "see" a person in the environment 100 even if they are behind such an object. This is not the case for sonar.

Each of the activity sensor 204 and the active reflected wave detector 206 has a field of view. The activity sensor 204 and the active reflected wave detector 206 may be arranged such that their fields of view overlap. The fields of view of the activity sensor 204 and the active reflected wave detector 206 may partially or fully overlap. Thus there is at least a partial overlap between the fields of view of the activity sensor 204 and the active reflected wave detector 206.

The overlapping, or partial overlapping, of the fields of view is, in some embodiments, in the 3D sense. However in other embodiments the overlapping, or partial overlapping, of the fields of view may be in a 2D, plan view, sense. For example there may be an overlapping field of view in the X and Y axes, but with a non-overlap in the Z axis.

In embodiments whereby the activity sensor 204 is a motion detector, the motion detector 204 may have a vertical field of view limited to heights above a predefined height threshold (e.g. 70 cm) above the floor level, so as to avoid triggering by pets. In these embodiments, the active reflected wave detector 206 on the other hand would have a field of view that includes heights below this height threshold, e.g. between the threshold and the floor level, to be able to detect the person when they are close to the floor—which is a situation that means they may have fallen. In some embodiments the field of view of the active reflected wave detector 206 also includes heights above the height threshold so as to assist in any reflected-wave measurements of the person when the person is standing. In embodiments, the active reflected wave detector 206 is used to determine whether the person is in a posture that may be relate to them having fallen. This may be achieved for example by detecting a height associated with a certain location on their body, e.g. a location above their legs.

In operation, the CPU 202 uses the output of the active reflected wave detector 206 to determine the presence of a person and/or a state of the person and/or a condition of the person.

In the context of the present disclosure, the state of the person may be a characterization of the person based on a momentary assessment. For example, a classification passed on their position (e.g. in a location in respect to the floor and in a configuration which are consistent or inconsistent with having fallen) and/or their kinematics (e.g. whether they have a velocity that is consistent or inconsistent with them having fallen, or having fallen possibly being immobile). In the context of the present disclosure, the condition of the person may comprise a determination of an aspect of the person's health or physical predicament, for example whether they are in a fall condition whereby they have fallen and are substantially immobile, such that they may not be able (physically and/or emotionally) to get to a phone to call for help. In some embodiments this involves an assessment of the person's status over time, such as in the order or 30-60 seconds. However, the condition of the person may in some contexts be synonymous with the status of the person. For example, by determining that the person is in a safe supported state or a standing state, it may be concluded that the person is not currently in a fall condition, whereby they are on the floor and potentially unable to seek help. It may additionally or alternatively be concluded that they are in a resting condition because of their status being determined to be in a safe supported state, e.g. lying on a bed. In another example their condition may be classified as active and/or mobile based on a determination of a walking status.

Figure 3:
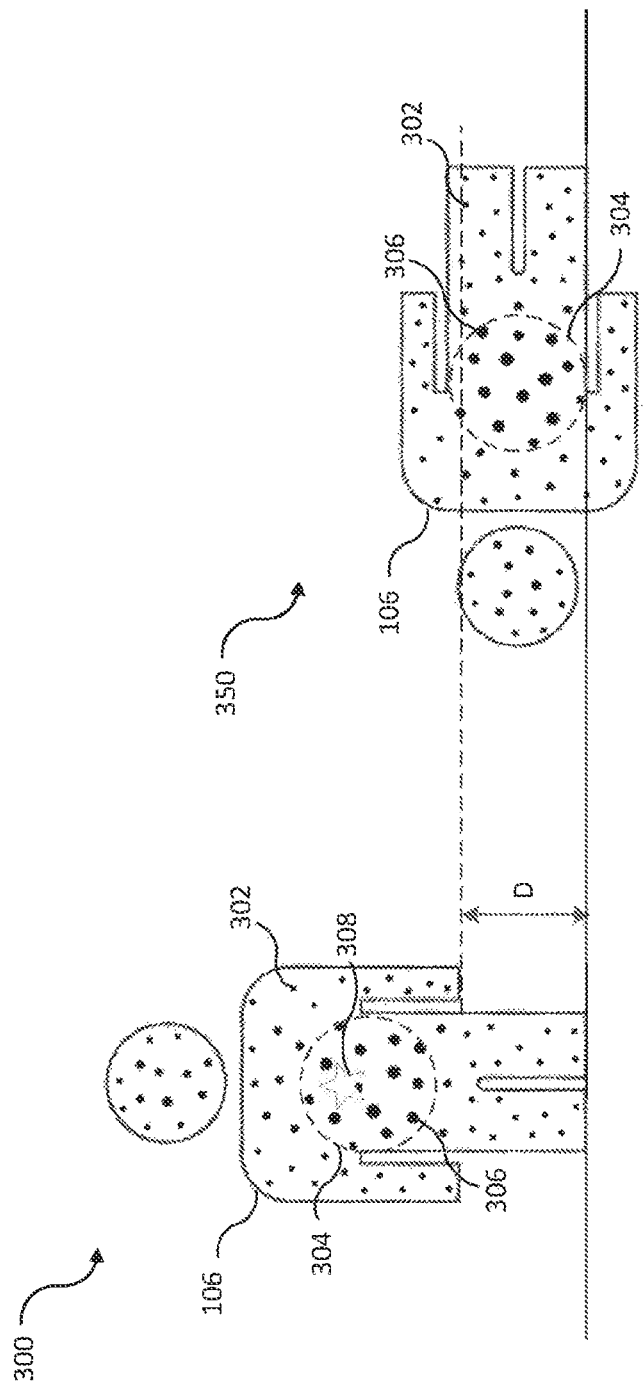
FIGS. 3a and 3b illustrates a human body with indications of reflections measured by an active reflected wave detector when the person is in a standing non-fall state and in a fall state.

FIG. 3a illustrates a free-standing human body 106 with indications of reflective wave reflections therefrom in accordance with embodiments.

For each reflected wave measurement, for a specific time in a series of time-spaced reflected wave measurements, the reflected wave measurement may include a set of one or more measurement points that make up a "point cloud", the measurement points representing reflections from respective reflection points from the environment. In embodiments, the active reflected wave detector 206 provides an output to the CPU 202 for each captured frame as a point cloud for that frame. Each point 302 in the point cloud may be defined by a 3-dimensional spatial position from which a reflection was received, and defining a peak reflection value, and a doppler value from that spatial position. Thus, a measurement received from a reflective object may be defined by a single point, or a cluster of points from different positions on the object, depending on its size.

In some embodiments, such as in the examples described herein, the point cloud represents only reflections from moving points of reflection, for example based on reflections from a moving target. That is, the measurement points that make up the point cloud represent reflections from respective moving reflection points in the environment. This may be achieved for example by the active reflected wave detector 206 using moving target indication (MTI). Thus, in these embodiments there must be a moving object in order for there to be reflected wave measurements from the active reflected wave detector (i.e. measured wave reflection data), other than noise. The minimum velocity required for a point of reflection to be represented in the point cloud is less for lower frame rates. Alternatively, the CPU 202 receives a point cloud from the active reflected wave detector 206 for each frame, where the point cloud has not had pre-filtering out of reflections from moving points. Preferably for such embodiments, the CPU 202 filters the received point cloud to remove points having Doppler frequencies below a threshold to thereby obtain a point cloud representing reflections only from moving reflection points. In both of these implementations, the CPU 202 accrues measured wave reflection data which corresponds to point clouds for each frame whereby each point cloud represents reflections only from moving reflection points in the environment.

In other embodiments, no moving target indication (or any filtering) is used. In these implementations, the CPU 202 accrues measured wave reflection data which corresponds to point clouds for each frame whereby each point cloud can represent reflections from both static and moving reflection points in the environment. Even without removal of measurement points representing reflections from static objects the lower frame rate can still detect slower movements than at the higher frame rate.

FIG. 3a illustrates a map of reflections. The size of the point represents the intensity (magnitude) of energy level of the radar reflections (see larger point 306). Different parts or portions of the body reflect the emitted signal (e.g. radar) differently. For example, generally, reflections from areas of the torso 304 are stronger than reflections from the limbs. Each point represents coordinates within a bounding shape for each portion of the body. Each portion can be separately considered and have separate boundaries, e.g. the torso and the head may be designated as different portions. The point cloud can be used as the basis for a calculation of a reference parameter or set of parameters which can be stored instead of or in conjunction with the point cloud data for a reference object (human) for comparison with a parameter or set of parameters derived or calculated from a point cloud for radar detections from an object (human).

When a cluster of measurement points are received from an object in the environment 100, a location of a particular part/point on the object or a portion of the object, e.g. its centre, may be determined by the CPU 202 from the cluster of measurement point positions having regard to the intensity or magnitude of the reflections (e.g. a centre location comprising an average of the locations of the reflections weighted by their intensity or magnitude). As illustrated in FIG. 3a, the reference body has a point cloud from which its centre has been calculated and represented by the location 308, represented by the star shape. In this embodiment, the torso 304 of the body is separately identified from the body and the centre of that portion of the body is indicated. In alternative embodiments, the body can be treated as a whole or a centre can be determined for each of more than one body part e.g. the torso and the head, for separate comparisons with centres of corresponding portions of a scanned body.

In one or more embodiments, the object's centre or portion's centre is in some embodiments a weighted centre of the measurement points. The locations may be weighted according to an Radar Cross Section (RCS) estimate of each measurement point, where for each measurement point the RCS estimate may be calculated as a constant (which may be determined empirically for the reflected wave detector 206) multiplied by the signal to noise ratio for the measurement divided by $R^4$, where R is the distance from the reflected wave detector 206 antenna configuration to the position corresponding to the measurement point. In other embodiments, the RCS may be calculated as a constant multiplied by the signal for the measurement divided by $R^4$. This may be the case, for example, if the noise is constant or may be treated as though it were constant. Regardless, the received radar reflections in the exemplary embodiments described herein may be considered as an intensity value, such as an absolute value of the amplitude of a received radar signal.

In any case, the weighted centre, WC, of the measurement points for an object may be calculated for each dimension as:

$$WC = \frac{1}{\sum_{n=1}^{N} W_n} \sum_{n=1}^{N} (W_n P_n)$$

Where:
N is the number of measurement points for the object;
$W_n$ is the RCS estimate for the $n^{th}$ measurement point; and
$P_n$ is the location (e.g. its coordinate) for the $n^{th}$ measurement point in that dimension.

When classifying the state of a person, the CPU 202 may perform a determination that the person is in a fall position (i.e. a position that is consistent with them haven fallen) or a non-fall position (indicative that they are, at least temporarily, in a safe state). In some embodiments of the present disclosure the determination that the person is in a fall position is used as an indicator that the person may be in need of help. In some embodiments, being in a position which is consistent with the person having fallen does not necessarily mean they have fallen, or have fallen such that they need help. For example, they may be on the floor for other reasons, or they may have had a minor fall from which they can quickly recover. For such embodiments, if it is concluded, based on classified states of the person for subsequent times, that they remain in a fall position for sufficient time it may be concluded that they are sufficiently likely to have fallen to be classified as being in a fall condition, and the device 102 may therefore take appropriate action accordingly, e.g. by sending a notification to a remote device.

In some embodiments, the classification of the state of a person performed by the CPU 202 may provide further detail on the non-fall condition for example, the CPU 202 may be able to provide a classifier output indicative that the person is in a state from one or more of: a free-standing state (e.g. they are walking); a safe supported state which may be a reclined safe supported state whereby they are likely to be safely resting (e.g. a state in which they are in an elevated lying down position, or in some embodiments this may additionally encompass being in a sitting position on an item of furniture); and a standing safe supported state (e.g. they are standing and leaning on a wall). In other embodiments the non-fall states may be grouped differently. For example, the non-fall states may include a stationary non-floor position (encompassing both a reclined safe supported state and a standing stationary state whether supported or not in the standing state) and an ambulatory state. The CPU 202 may be able to classify the person as crawling, which may be regarded as a fall state or a non-fall state (given that if the person has fallen the person is still able to move so may be regarded as less critical) dependent on how the CPU 202 is configured.

The processing performed by the CPU 202 to determine the classifier output looks at a set of sequential frames over a period of time and classifies the state of the person as being in a fall position based on the person's fall/non-fall positions for the respective frames. Multiple frames (e.g. 10 frames) may be used to determine whether there are more fall or non-fall results to improve the accuracy of the determination (the result which occurs more is the selected result). That is, multiple per-frame classifications of the state of the person may be used to determine the classifier output indicative of the state of the person based on a plurality of time-sequential frames. This is described in more detail below.

Determining a State of a Person in an Environment

Figure 4:
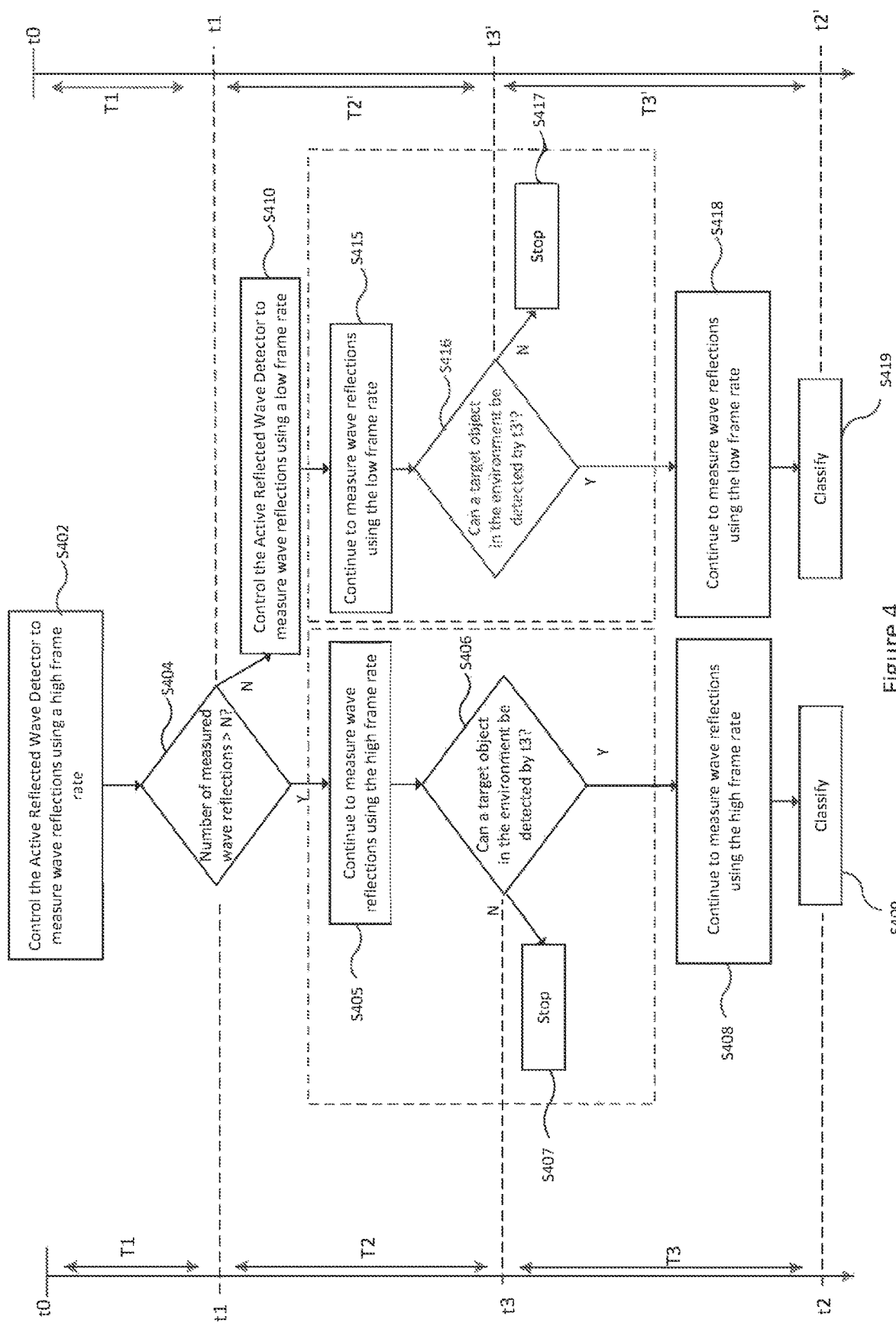
FIG. 4 illustrates a process for determining a state of a person in an environment.

We now refer to FIG. 4 which illustrates an example process 400 performed by the CPU 202 for determining a state of a person in the environment 100. Below we refer to a "higher" frame rate and a "lower" frame rate, these terms are merely used to convey that the higher frame rate is higher than the lower frame rate. In embodiments, the amount of time (of data capture) per frame is inversely dependent on the frame rate used by the reflected wave detector 206, whereby faster frame rates corresponds to a shorter period of time per frame.

The inventors have identified that over the same period of time, a higher frame rate does result in more detections than a lower frame rate almost all of the time, at least if the person is static or at least relatively stationary, as opposed to walking for example, and the higher frame rate has a Doppler resolution capable of detecting velocities (based on Doppler) at least when the person is standing essentially still, or at least standing still, or at least lying essentially still. For example, the Doppler resolution at the higher frame rate of 2 FPS may be 5.5 mm/second. The detectable velocity range of the lower frame rate may for example be 2.2 mm/second-17 cm/second, and the detectable velocity range of the higher frame rate may for example be 5.5 mm/second-42 cm/second.

As noted above with reference to FIG. 2, the device 102 may comprise an activity sensor 204 in the form of a motion detector. In these embodiments, the upper bound of the velocity range of the higher frame rate (in this example 42 cm/second) may advantageously be greater than a minimum velocity that is able to trigger the motion detector 204 to detect a motion, more preferably a minimum velocity that the motion detector 204 can guarantee will result in a detected motion. By doing so, if a person is moving too fast to be detected by the active reflected wave detector 206, they will be detected by the motion detector 204. As will be described in relation to FIG. 5, in some embodiments, operation of the active reflected wave detector 206 may be triggered by the motion detector 204. For example, the active reflected wave detector 206 may be triggered to operate once a time window since that most recent motion detection by motion detector 204 has expired. Thus, as long as relatively frequent motion detections are occurring, there is no need to operate the active reflected wave detector 206. This enables energy consumption to be saved in applications in which the active reflected wave detector 206 is only needed to classify a status of the person in response to detected motion, which in some applications happens after such a time window as described above expires. One example of such an application is where the device 102 is used as a fall detector, since once a person has fallen, they will generally be stationary or sufficiently stationary such that a motion detector will stop detecting their motion.

In an example, the minimum velocity that that is able to trigger the motion detector to detect a motion or, in some embodiments, the minimum velocity that the motion detector can guarantee will result in a detected motion, is 35 cm/second, which is less than 42 cm/second. The minimum velocity for the motion detector and/or the upper velocity detectable at the higher frame rate may be dependent on the maximum distance away from device 102 the moving object is positioned. Thus the device 102 may have a specified maximum range for which the device is intended to be used, which may for example be less than 15 meters or less than 12 meters or less than 10 meters, on in a specific example, which may correspond to the 35 cm/second and 42 cm/second example described above, the range may be specified to have a maximum that is between 7 and 8 meters.

Under such conditions there may be exceptions to the rule that the higher frame rate will result in more detections. In particular, using a lower frame rate may result in more detections if the person is too still to be detected sufficiently at the higher frame rate. For example, if the higher frame rate can detect an essentially still lying person but not necessarily an unconscious person. Further, if the person is far from the active reflected wave detector then, this can also impact the performance of the higher frame rate in detecting low velocities, thus potentially resulting in fewer detection than if the person was closer to the active reflected wave detector.

The Doppler resolution at the higher frame rate is such that it can't see movements as slow as can be seen at the lower frame rate. The higher frame typically works better (more detections and thus more points in the point cloud received from the active reflected wave detector 206) at least when the person is not in a stationary lying condition or at least when the person is not in a stationary fall condition. The Doppler derived velocity-range detectable at the higher frame rate may have a lower velocity cutoff (e.g. 3 dB gain drop) of 5 mm/sec. The Doppler derived velocity-range detectable at the lower frame rate may have a lower velocity cutoff (e.g. 3 dB gain drop) of 2 mm/sec.

At step S402, at an initial time t0 the CPU 202 controls the active reflected wave detector 206 to measure wave reflections from the environment using a higher frame rate (otherwise referred to herein as a first frame rate) to accrue measured wave reflection data of respective frames (the accrued measured wave reflection data representing reflections from moving reflection points) for a classifier. In one example, the higher frame rate is 2 frames per second.

The CPU 202 maintains the active reflected wave detector 206 measuring wave reflections from the environment using the higher frame rate for a first predetermined time period, T1 (otherwise referred to herein a "first amount of time", t1). In one example, the first predetermined time period, T1, is 2 seconds.

After expiry of the first predetermined time period, T1, the process 400 proceeds to step S404.

At step S404 the CPU 202 determines whether a predefined criteria based on the measured wave reflection data is satisfied, wherein satisfaction of the predefined criteria is indicative of the classifier being likely to successfully identify a fall status of the person by a second amount of time t2 (from the initial time t0) of accruing measured wave reflection data of respective frames from the active reflected wave detector 206, the second amount of time being greater than the first amount of time. The second amount of time represents an upper limit on the time elapsing from t0 before classification is performed by the active reflected wave detector 206. The ability of the classifier to successfully identify a fall status of the person can be defined in any number of ways well known to persons skilled in the art.

The determination performed by the CPU 202 at step S404 can be performed in a number of ways.

In some implementations the predefined criteria relates to a predefined metric derived from the measured wave reflection data accrued by the active reflected wave detector 206 during the first predetermined time period, T1, whereby the predefined metric derived from the measured wave reflection data is, or is based on, at least one count of measured wave reflections accrued during the first amount of time.

FIG. 4 illustrates one implementation whereby at step S404 the predefined criteria indicative of the classifier being likely to successfully identify a fall status of the person by a second amount of time of data accrual comprises that a count of measured wave reflections accrued over the first amount of time exceeds a first predetermined number. Thus at step S404 the CPU 202 determines whether a number of measured wave reflections output from the active reflected wave detector exceeds the first predetermined number. As mere examples, the first predetermined number may be 25, 50 or 100.

Additionally or alternatively, the predefined criteria indicative of the classifier being likely to successfully identify a fall status of the person by a second amount of time of data accrual comprises that there are at least a predetermined minimum number of frames (e.g. 3-6 frames) during the first amount of time that each have counts of measured wave reflections that exceed a second predetermined number (the minimum number of detections per frame may be between 2-4). Thus at step S404 the CPU 202 determines whether there are at least the predetermined minimum number of frames during the first amount of time that each have counts of measured wave reflections in the frame's point cloud that exceed the second predetermined number. In some implementations, at step S404 the CPU 202 determines whether there are at least the predetermined minimum number of consecutive frames during the first amount of time that each have counts of measured wave reflections in the frame's point cloud that exceed the second predetermined number.

In some implementations, in order to determine whether the classifier is likely to successfully identify a fall status of the person by the second amount of time measured, wave reflection data accrued by the active reflected wave detector 206 during the first predetermined time period, T1, is supplied to a classifier module on the CPU 202 which attempts to classify the fall status of a person in the environment based on this input data.

In these implementations the predefined criteria relates to a predefined metric derived from the measured wave reflection data accrued by the active reflected wave detector 206 during the first predetermined time period, T1, whereby the predefined metric is a classification performance metric. That is, the classifier performance can be assessed in real time using known methods. For example, based on statistical methods (e.g. by comparing the classifier input data to the spread of data in the reference data set). The classification performance metric may be a quantitative measure of confidence or probability that the classification is correct, for example a percentage likelihood that the classifier will accurately determine the state of the person. The predefined criteria indicative of the classifier being likely to successfully identify a fall status of the person by a second amount of time of data accrual is that the classification performance metric exceeds a classification performance threshold (e.g. a 70% threshold).

In other implementations the predefined criteria does not relate to a predefined metric derived from the measured wave reflection data accrued by the active reflected wave detector 206 during the first predetermined time period, T1.

For example the predefined criteria indicative of the classifier being likely to successfully identify a fall status of the person by a second amount of time of data accrual may be that a tracking algorithm implemented by the CPU 202 is able to track a potentially human object based on the measured wave reflection data and that the tracking meets a predefined performance metric. The tracking algorithm converging is one method of identifying that the tracking algorithm implemented by the CPU 202 is able to track a potentially human object based on the measured wave reflection data meeting a predefined performance metric. An example of such a tracking algorithm is described in more detail below.

In the event that the CPU 202 determines at step S404 that the predefined criteria is not met, the process 400 proceeds to step S410 where the CPU 202 controls the active reflected wave detector 206 to accrue measured wave reflection data at a lower frame rate (otherwise referred to herein as a "lower second frame rate") for classifying the fall status based on measured wave reflection data accrued at the lower frame rate. In one example, the lower frame rate is 0.7 frames per second.

The lower frame rate improves the Doppler resolution so it is advantageous to use the lower frame rate when the higher frame rate is not producing enough detections.

After step S410, the process 400 may proceed directly to step S418. At step S418 the CPU 202 maintains the active reflected wave detector 206 measuring wave reflections from the environment using the lower frame rate for up to a third predetermined time period, T3'. In one example the third predetermined time period, T3', is 15 seconds or less.

At or before expiry of the third predetermined time period, T3', the process 400 proceeds to step S419 whereby a classifier module running on the CPU 202 classifies the fall status of a person in the environment. It will be appreciated that classifier module may be able to classify the status of a person in the environment based on the measured wave reflection data it has accrued before expiry of the third predetermined time period, T3'.

In embodiments whereby after step S410, the process 400 proceeds directly to step S418, the "second amount of time" referred to above corresponds to the summation of the predetermined time period, T1, and the third predetermined time period, T3'.

In embodiments whereby after step S410, the process 400 proceeds directly to step S418, the classification performed by the classifier module at step S419 may be based on measured wave reflection data accrued only during the third predetermined time period, T3', whilst the active reflected wave detector 206 was operating using the lower frame rate.

In another example, in embodiments whereby after step S410, the process 400 proceeds directly to step S418, the classification performed at step S419 by the classifier module may be based on (i) measured wave reflection data accrued during the first predetermined time period, T1, whilst the active reflected wave detector 206 was operating using the higher frame rate; in addition to (ii) measured wave reflection data accrued during the third predetermined time period, T3', whilst the active reflected wave detector 206 was operating using the lower frame rate.

After step S410, the CPU 202 may track an object based on measured wave reflection data accrued at the lower frame rate; and if the tracking does not meet a predefined performance metric by a third amount of time (t3'; counted from t0), that is less than the second amount of time (t2'; also counted from t0), the CPU 202 deactivates the active reflected wave detector 206 prior to elapsing of the second amount of time. This step is optional as indicated by the dashed box in FIG. 4.

At step 415 the CPU 202 maintains the active reflected wave detector 202 measuring wave reflections from the environment using the lower frame rate for up to a second predetermined time period, T2' e.g. up to the third amount of time t3'. In one example the second predetermined time period, T2', is 15 seconds or less. Thus, the third amount of time t3' may be 17 seconds or less.

At step S416, the CPU 202 determines whether a target object (e.g. a person) can be detected in the environment by the third amount of time t3', using the measured wave reflection data accrued during the second predetermined time period, T2', whilst the active reflected wave detector 206 was operating using the lower frame rate. The determination at step S416 may additionally use the measured wave reflection data accrued during the first predetermined time period, T1, whilst the active reflected wave detector 206 was operating using the higher frame rate.

If at step S416, the CPU 202 determines that the target object cannot be detected in the environment by the third amount of time t3', the process 400 proceeds to step S417 where the CPU 202 deactivates the active reflected wave detector 206. In this scenario, power is conserved as the classifier module running on the CPU does not perform any classification and the active reflected wave detector 206 no longer performs active wave measurements once deactivated.

If the CPU 202 determines at step S416 that a target object (e.g. a person) can be detected in the environment by the third amount of time t3' the process 400 proceeds to steps S418 and S419 described above. It will be appreciated that the CPU 202 may determine that a target object (e.g. a person) can be detected in the environment before expiry of the second predetermined time period, T2', and once this determination is made the process proceeds to step S418.

In embodiments whereby after step S410, the process 400 proceeds to step S415, the "second amount of time" referred to above corresponds to the summation of the predetermined time period, T1; the second predetermined time period, T2'; and the third predetermined time period, T3'.

In embodiments where the CPU 202 tracks an object based on measured wave reflection data accrued at the lower frame rate, the classification performed by the classifier module at step S419 may be based on measured wave reflection data accrued only during the third predetermined time period, T3', whilst the active reflected wave detector 206 was operating using the lower frame rate.

Optionally, in embodiments where the CPU 202 tracks an object based on measured wave reflection data accrued at the lower frame rate, the classification performed by the classifier module at step S419 may additionally be based on one or more of:

(i) measured wave reflection data accrued during the first predetermined time period, T1, whilst the active reflected wave detector 206 was operating using the higher frame rate; and (ii) measured wave reflection data accrued during the second predetermined time period, T2', whilst the active reflected wave detector 206 was operating using the lower frame rate.

Step S416 is performed using a tracking module in the CPU 202. The tracking module can use any known tracking algorithm. For example, the active reflected wave detector 206 may generate a plurality of detection measurements (e.g. up to 100 measurements, or in other embodiments hundreds of measurements) for a given frame. Each measurement can be taken a defined time interval apart such as 0.5, 1, 2 or 5 seconds apart. Each detection measurement may include a plurality of parameters in response to a received reflective wave signal above a given threshold. The parameters for each measurement may for example include an x and y coordinate (and z coordinate for a 3D active reflected wave detector 206), a peak reflection value, and a Doppler value corresponding to the source of the received radar signal.

The data can then be processed using a clustering algorithm to group the measurements into one or more measurement clusters corresponding to a respective one or more targets. An association block of the tracking module may then associate a given cluster with a given previously measured target. A Kalman filter of the tracking module may then be used to estimate the next position of the target based on the corresponding cluster of measurements and a prediction by the Kalman filter of the next position based on the previous position and one or more other parameters associated with the target, e.g. the previous velocity. As an alternative to using a Kalman filter other tracking algorithms known by the person skilled in the art may be used.

From the reflected wave measurements an RCS of an object represented by a cluster of measurement points can be estimated by summing the RCS estimates of the each of the measurement points in the cluster. This RCS estimate may be used to classify the target as a human target if the RCS is within a particular range potentially relevant to humans for the frequency of the signal emitted by the active reflected wave detector 206, as the RCS of a target is frequency dependent. Taking a 77 GHz radar signal as an example, from empirical measurements, the RCS (which is frequency dependent) of an average human may be taken to be in the order of 0.5 m$^2$, or more specifically in a range between 0.1 and 0.7 m$^2$, with the value in this range for a specific person depending on the person and their orientation with respect to the radar. The RCS of human in the 57-64 GHz spectrum is similar to the 77 GHz RCS— i.e. 0.1 and 0.7 m$^2$.

The tracking module may output values of location, velocity and/or RCS for each target, and in some embodiments also outputs acceleration and a measure of a quality of the target measurement, the latter of which is essentially to act as a noise filter. The values of position (location) and velocity (and acceleration, if used) may be provided in 2 or 3 dimensions (e.g. cartesian or polar dimensions), depending on the embodiment.

The Kalman filter tracks a target object between frames and whether the Kalman filter's estimation of the objects' parameters converges to the object's actual parameters may depend on the kinematics of the object, with more static objects generally having better convergence. The performance of the Kalman filter may be assessed in real time using known methods to determine whether the tracking meeting a predefined performance metric, this may be based on a covariance of the Kalman filter's estimation of the object's parameters. For example, satisfactory tracking performance may be defined as requiring at least that the covariance is below a threshold. Depending on the object's motion, the Kalman filter may or may not produce satisfactory performance within a predefined number of frames (e.g. 3-5 frames). The frames may be taken at a rate of 2 Hz, for example.

The velocity information assists the CPU 202 in detecting whether a human is present in the environment. For example, it may be concluded that no human is present if there is no detected object having a velocity within a predefined range and/or having certain dynamic qualities that are characteristic of a human.

We now refer back to step S404.

In the event that the CPU 202 determines at step S404 that the predefined criteria is met, the process 400 may proceed directly to step S408. At step S408 the CPU 202 maintains the active reflected wave detector 206 measuring wave reflections from the environment using the higher frame rate for up to a third predetermined time period, T3. T3 may be the same as T3', however they may be different.

At or before expiry of the third predetermined time period, T3, the process 400 proceeds to step S409 whereby a classifier module running on the CPU 202 classifies the fall status of a person in the environment. It will be appreciated that classifier module may be able to classify the status of a person in the environment based on the measured wave reflection data it has accrued before expiry of the third predetermined time period, T3'.

In embodiments whereby after step S404, the process 400 proceeds directly to step S408, the "second amount of time" referred to above corresponds to the summation of the predetermined time period, T1, and the third predetermined time period, T3.

In embodiments whereby after step S404, the process 400 proceeds directly to step S408. The classification performed by the classifier module at step S409 may be based on measured wave reflection data accrued during the third predetermined time period, T3, whilst the active reflected wave detector 206 was operating using the higher frame rate.

In another example, in embodiments whereby after step S404, the process 400 proceeds directly to step S408, the classification performed by the classifier module at step S409 may be based on (i) measured wave reflection data accrued during the first predetermined time period, T1, whilst the active reflected wave detector 206 was operating using the higher frame rate; in addition to (ii) measured wave reflection data accrued during the third predetermined time period, T3, whilst the active reflected wave detector 206 was operating using the higher frame rate.

After step S404, the CPU 202 may track an object based on measured wave reflection data accrued at the higher frame rate; and if the tracking does not meet a predefined performance metric by a third amount of time (t3), that is less than the second amount of time (t2), the CPU 202 deactivates the active reflected wave detector 206 prior to elapsing of the second amount of time. This step is optional as indicated by the dashed box in FIG. 4.

At step 405 the CPU 202 maintains the active reflected wave detector 202 measuring wave reflections from the environment using the higher frame rate for up to a second predetermined time period, T2 e.g. up to the third amount of time t3. T2 may be the same as T2', however they may be different.

At step S406, the CPU 202 determines whether a target object (e.g. a person) can be detected in the environment within the second predetermined time period, T2, using the measured wave reflection data accrued during the second predetermined time period, T2, whilst the active reflected wave detector 206 was operating using the higher frame rate. The determination at step S406 may additionally use the measured wave reflection data accrued during the first predetermined time period, T1, whilst the active reflected wave detector 206 was operating using the higher frame rate.

If at step S406, the CPU 202 determines that the target object cannot be detected in the environment by the third amount of time t3', the process 400 proceeds to step S407 where the CPU 202 deactivates the active reflected wave detector 206. In this scenario, power is conserved as the classifier module running on the CPU does not perform any classification and the active reflected wave detector 206 no longer performs active wave measurements once deactivated.

If the CPU 202 determines at step S406 that a target object (e.g. a person) can be detected in the environment within the second predetermined time period, T2, the process 400 proceeds to steps S408 and S409 described above. It will be appreciated that the CPU 202 may determine that a target object (e.g. a person) can be detected in the environment before expiry of the second predetermined time period, T2, and once this determination is made the process proceeds to step S408.

In embodiments whereby after step S404, the process 400 proceeds to step S405, the "second amount of time" referred to above corresponds to the summation of the predetermined time period, T1; the second predetermined time period, T2; and the third predetermined time period, T3.

In embodiments where the CPU 202 tracks an object based on measured wave reflection data accrued at the higher frame rate, the classification performed by the classifier module at step S409 may be based on measured wave reflection data accrued only during the third predetermined time period, T3, whilst the active reflected wave detector 206 was operating using the higher frame rate.

Optionally, in embodiments where the CPU 202 tracks an object based on measured wave reflection data accrued at the higher frame rate, the classification performed by the classifier module at step S409 may additionally be based on one or more of:

(i) measured wave reflection data accrued during the first predetermined time period, T1, whilst the active reflected wave detector 206 was operating using the higher frame rate; and (ii) measured wave reflection data accrued during the second predetermined time period, T2, whilst the active reflected wave detector 206 was operating using the higher frame rate.

At step S409 and S419 the classifier module running on the CPU 202 classifies the fall status of the person in the environment based on measured wave reflection data associated with multiple frames and provides the fall status as a classifier output. The fall status may be that the person is a fall state or a non-fall state. The fall state and/or the non-fall state may each have subcategories of states that may be identified by the classifier to provide further information relating to the person in the environment. For example, the classifier module may indicate that the person is in a fall state and static; the person is in a fall state and moving; the person is in a non-fall state and free-standing; and/or the person is in a non-fall state and the person is in a supported state (e.g. lying on a bed or sitting on a sofa).

In response to the CPU 202 classifying the person as being in a fall state the CPU 202 may issue a fall detection alert.

In other embodiments, a fall detection alert is only issued by the CPU 202 if the CPU 202 classifies the person as being in a fall condition that is based on a plurality of fall state determinations for corresponding to a respective plurality of time periods. For example, in some embodiments, once the CPU 202 has performed a first iteration of the process 400 shown in FIG. 4 the CPU 202 deactivates the active reflected wave detector 206 for a predetermined time period. Upon expiry of the predetermined time period, the CPU 202 activates the active reflected wave detector 206 and performs a second iteration of the process 400. This second iteration checks whether they are in the same state as determined by the first classification. For example, if following the first iteration of the process 400 the CPU 202 classifies a person as being in a fall state, and following the second iteration of the process 400 the CPU 202 again classifies a person as being in a fall state, the CPU determines they are in a fall condition and issues a fall detection alert. This advantageously avoids false alarms.

The issuance of the fall detection alert may be performed in various ways. For example the CPU 202 may transmit an alert message to a remote device (not shown in FIG. 1), which may be via a wireless connection. This remote device may for example be a mobile computing device (e.g. a tablet or smartphone) associated with a carer or relative. Alternatively the remote device may be a computing device in a remote location (e.g. a personal computer in a monitoring station). Alternatively the remote device may be a control hub in the environment 100 (e.g. a wall or table mounted control hub). The control hub may be a control hub of a system that may be monitoring system and/or may be a home automation system. The notification to the control hub is in some embodiments via wireless personal area network, e.g. a low-rate wireless personal area network. Alternatively or additionally the CPU 202 may control a visual output device (e.g. a light) on device 102 to output a visual alert of the fall detection. Alternatively or additionally the CPU 202 may control an audible output device (e.g. a speaker) on device 102 to output an audible alert of the fall detection.

Classifier Operation

In embodiments, the final classifier output indicative of the state of the person performed at steps S409 and S419 is based on multiple frames of measured wave reflection data.

The classifier module may perform multiple per-frame classifications of the state of the person in order to determine the final classifier output indicative of the state of the person. That is, the classifier module may combine the multiple per-frame classifications order to determine the final classifier output indicative of the state of the person. This can be implemented in various ways for example the classifier module may perform averaging or use a simple voting scheme to see which classification result is most prevalent. Whilst in this method each time the classifier classifies it is based on a single frame, an alternative is that the classifier input comprises multiple frames, and therefore the classification performed by the classifier module produces the final classifier output indicative of the state of the person.

As outlined in more detail below the classification performed at steps S409 and S419 may be performed in a number of different ways.

Using Thresholds

As noted above the classification may be performed by the CPU 202 by looking at a set of sequential frames over a period of time and classifying the state of the person as being in a fall position based on the person's fall/non-fall positions for the respective frames. Multiple frames (e.g. 10 frames) may be used to determine whether there are more fall or non-fall results to improve the accuracy of the determination (the result which occurs more is the selected result). That is, multiple per-frame classifications of the state of the person may be used to determine the final classifier output indicative of the state of the person.

In order to perform the per-frame classification of the state of the person in the environment, the CPU 202 may determine a height metric associated with at least one measurement of a reflection from the person conveyed in the output of the active reflected wave detector 206 and compare the height metric to at least one threshold.

The height metric may be a height of a weighted centre of the measurement points of a body or part thereof (where each measurement is weighted by the RCS estimation), and the CPU 202 may compare this height metric to a threshold distance, D, from the floor (e.g. 30 cm) and determine that the person in the environment is in a standing (non-fall) position if the height metric exceeds the threshold distance, this is illustrated in FIG. 3*a*.

The height metric used in the per-frame classification of the state of the person is not limited to being a height of a weighted centre of the measurement points of the person's body or part thereof. In another example, the height metric may be a maximum height of all of the height measurements associated with the person's body or part thereof. In another example, the height metric may be an average height (e.g. median z value) of all of the height measurements of the person's body or part thereof. In the case of using a weighted centre or average height, the "part thereof" may beneficially be a part of the body that is above the person's legs to more confidently distinguish between fall and non-fall positions.

If the height metric (e.g. weighted centre, average height and/or maximum height) is within (less than) the threshold distance, D, from the floor (e.g. 30 cm), the CPU 202 may determine that the person in the environment is in a fall position, this is illustrated in FIG. 3*b*. If the height metric is greater than a first threshold distance from the floor but less than a second threshold distance from the floor (for example the a maximum height amongst the measurements associated with body is between 30 cm and 1.3 m, the CPU 202 may be able to detect that the person is in a safe reclined position, e.g. lying down on a bed or couch, which is an example of a non-fall position.

In order to perform the per-frame classification of the state of the person in the environment, the CPU 202 may determine a velocity associated with the person using the measurements of reflections that are conveyed in the output of the active reflected wave detector 206 and compare the velocity to a velocity threshold. The tracking module referred to above may output a value of velocity for the target (person in the environment). For example, the velocity may assist in classifying whether a human is present in the environment. For example, it may be concluded that no human is present if there is no detected object having a velocity within a predefined range and or having certain dynamic qualities that are characteristic of a human. The comparison between the detected velocity associated with the person and the velocity threshold can also assist with narrowing the classification down to a specific state. For example if the detected velocity associated with the person is greater than the velocity threshold the CPU 202 can determine that the person is moving and is in either a crawling state or standing ambulatory state (e.g. they are walking). If the detected velocity associated with the person is not greater than the velocity threshold the CPU 202 may determine that the person is not moving and is either in a fall state or are in a reclined supported state (e.g. they are in an elevated lying down position or in a sitting position) or standing still.

Further if for a defined duration of time, a standard deviation of the velocity is below a predefined threshold it may be concluded that a person that is standing still is supported, e.g. leaning on a wall; or if above the threshold, that they are free-standing. In other embodiments the value of the velocity threshold alone or in combination with the standard deviation may be used to distinguish a free-standing state from a supported state.

In order to perform the per-frame classification of the state of the person in the environment, the CPU 202 may determine a spatial distribution, e.g. a variance or standard deviation, of the measurements of reflections that are conveyed in the output of the active reflected wave detector 206 and compare the spatial distribution to a threshold. This may include determining a horizontal spatial distribution of the measurements of reflections that are conveyed in the output of the active reflected wave detector 206 and comparing the horizontal spatial distribution to a horizontal spatial distribution threshold. Alternatively or additionally, this may include determining a vertical spatial distribution of the measurements of reflections that are conveyed in the output of the active reflected wave detector 206 and comparing the vertical spatial distribution to a vertical spatial distribution threshold.

The comparison between the spatial distribution(s) to a threshold can assist with narrowing the classification down to a specific state. For example, if the vertical spatial distribution is greater than the vertical spatial distribution threshold (high z variance) and/or the horizontal spatial distribution is less than the horizontal spatial distribution threshold (low x-y plane variance), then the CPU 202 can determine that the person is in a standing state, for example they may be in free-standing ambulation state (e.g. they are walking), in a safe supported state (e.g. they are standing and leaning on a wall), or a free-standing unsupported state. In another example, if the vertical spatial distribution is less than the vertical spatial distribution threshold (low z variance) and/or the horizontal spatial distribution is greater than the horizontal spatial distribution threshold (high x-y plane variance), then the CPU 202 can determine that the person is in a fall state or in a safe supported state (e.g. they are in an elevated lying down position). Alternatively the ratio of the horizontal spatial distribution to vertical spatial distribution may be compared with a threshold. Such a ratio being below a threshold that has a value less than 1 may be taken to indicate that the person is in a standing state. Such a ratio being above a threshold that has a value greater than 1 may be taken to indicate that the person is in a fall state or in an elevated lying down position, and hence in a safe supported state.

Using a Classifier Model

In other embodiments, in order to detect and classify the state of a person, rather than the CPU 202 determining one or more parameters associated with the measured wave reflections and then comparing the parameter(s) to one or more thresholds, the CPU 202 may supply the determined parameters as inputs into a classifier module running on the CPU 202 that has been trained using one or more training data sets which include reflected wave measurements and a corresponding definition of which output state the reflect wave measurements correspond to.

As noted above, the determined parameters may be associated with a single frame and the trained classifier module may perform multiple per-frame classifications of the state of the person which are then combined in order to determine the final classifier output indicative of the state of the person. Alternatively, determined parameters associated with multiple frames may be supplied as a single input to the trained classifier module which provides a classifier output which is indicative of the state of the person. In either case, the ultimate classification of the status of the person is based on multiple frames.

The received parameters may include one or more of: (i) a height metric associated with at least one reflection; (ii) a velocity associated with the person using the measurements of reflections; and (iii) a spatial distribution characterization of the measurements (e.g. one or more of a horizontal spatial distribution (e.g. a variance or equivalently a standard deviation), a vertical spatial distribution and a ratio therebetween. Additionally, RCS estimates may be used to aid in assessing whether the object being classified is in fact a human. Analysis of the wave reflections to determine whether the object is likely to be human may be performed before or after the classification, but in other embodiments it may be performed as part of the classification. Thus, the classifier may additionally receive the following parameters: (iv) a sum of RCS estimates, and in some embodiments (v) a distribution (e.g., variance or equivalently standard deviation) of RCS estimates. For example, the received parameters may be: 1. an average height (e.g. median z value); 2. a standard deviation of RCS estimates; 3. A sum of RCS estimates; and 4. a standard deviation of height(z) values.

In these embodiments the trained classifier module uses the received parameters and the training data set(s) to classify the state of the person in the environment.

It will be appreciated that this can be implemented in various ways.

The trained classifier module may be used at operation time to determine a classification score, using a method known by the person skilled in the art. The score may for example provide an indication of a likelihood or level of confidence that the received parameters correspond to a particular classifier output state. A determination of a particular classification (e.g. a fall position) may for example be based on whether a classification confidence score is greater than a threshold then the person is determined to be in that state. For example, the CPU 202 may determine that the person is in a fall state if the output of the classifier determines that there is more than a 60% likelihood (or some other predefined likelihood threshold, which may optionally be greater than 50%, or even less than 50% to be conservative/cautious) of the person being in a fall position.

It will be appreciated that it may not be necessary for the classifier module to be trained with a data set associated with a particular classifier state in order for the classifier module to classify the person as being in the particular classifier state. Consider the simple example whereby the trained classifier module is configured to indicate that the person is in one of two states (i.e. in a fall state or a non-fall state), the trained classifier module may have been trained with a data set including reflected wave measurements corresponding to a person in a fall state, and based on a low correlation of the received parameters to the training data set corresponding to a person in a fall state, the trained classifier module may be configured to indicate that the person is in a non-fall state.

Furthermore, as noted above, there need not be a two-step process of looking for a person and then classifying them. A trained classifier module could be used that is trained of different data that is not necessarily limited to reflections from discreet objects or from objects already identified as potentially being human. For example a classifier could be fed respective sets of training data for (i) a person is present and in a fall position; (ii) a person is present and in a non-fall position; and (iii) no person is present. The classifier may determine a classification of active reflected wave measurements based on which of the trained states it is most closely correlated with.

Any other method, known by the person skilled in the art, of training and using the classifier based on (i) the receiving parameters as exemplified above, and (i) the relevant output states may alternatively be used.

Triggering the Active Reflected Wave Detector

In embodiments, the active reflected wave detector 206 is only operated upon a determination that the person is relatively stationary determined by way of an activity sensor (e.g. a motion detector) not detecting motion for a defined time window.

Figure 5:
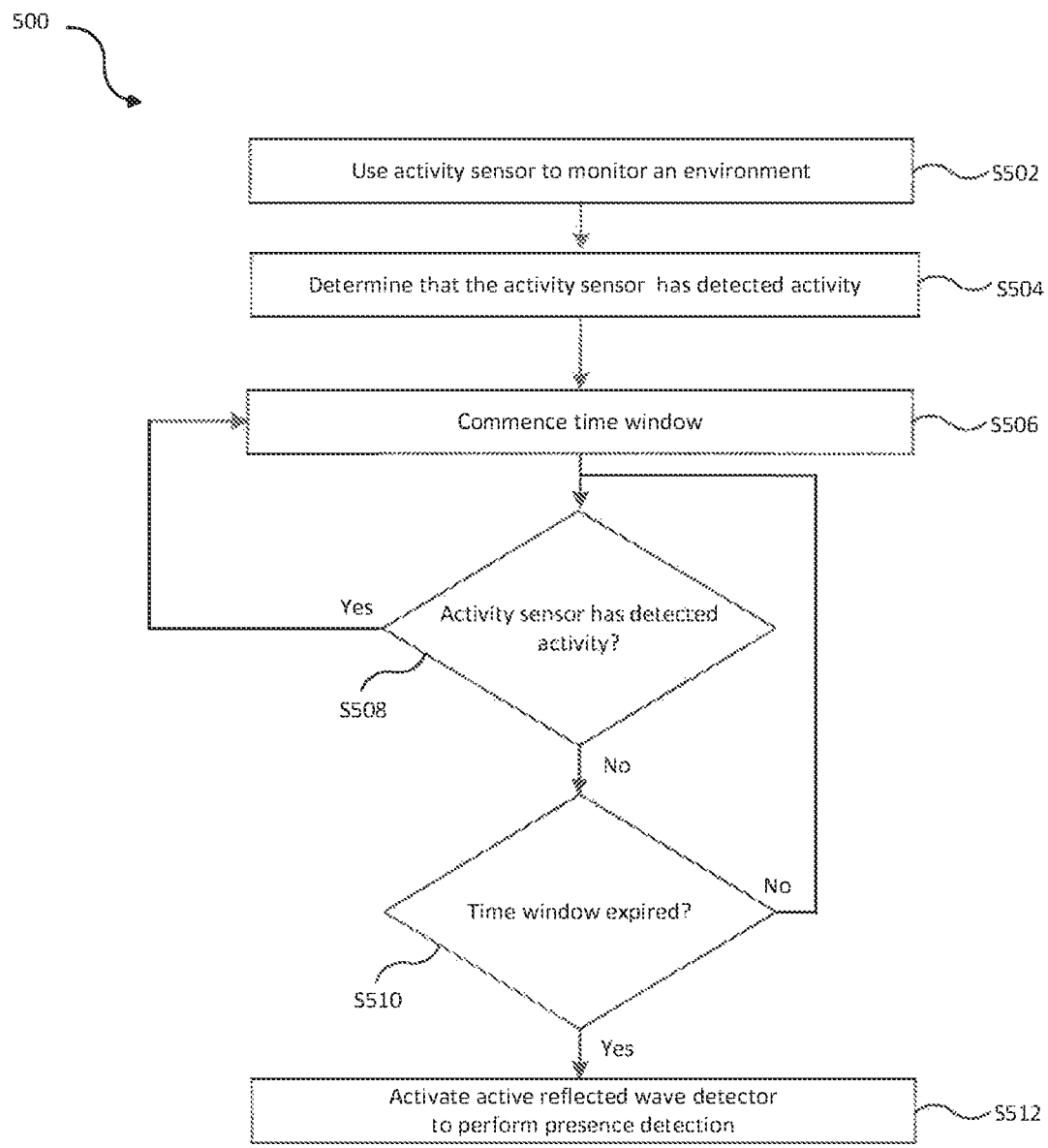
FIG. 5 illustrates a process for activating the active reflected wave detector.

Reference is now made to FIG. 5 which illustrates a process 500 performed by the CPU 202 for activating the active reflected wave detector 206.

It should be noted that when the process 500 is started, the active reflected wave detector 206 is in a deactivated state. In the deactivated state the active reflected wave detector 206 may be turned off. Alternatively, in the deactivated state the active reflected wave detector 206 may be turned on but in a low power consumption operating mode whereby the active reflected wave detector 206 is not operable to perform reflected wave measurements.

At step S502, the CPU 202 uses the activity sensor 204 to monitor the monitored space 104 in the environment 100. Step S502 may comprise the CPU 202 activating (i.e. turning on) the activity sensor 204. Alternatively, the activity sensor 204 may be activated (tuned on) immediately once the device 102 is powered on, and there may be no ability or need for the CPU to issue a command to activate the activity sensor 204 since it is automatically and always on.

At step S504, the CPU 202 determines that the activity sensor 204 has detected activity in the environment 100 based on monitoring the output of the activity sensor 204.

In response to the determination at step S504, the process 500 proceeds to step S506 where the CPU 202 commences a time window having a predefined duration. The predefined duration may be in the range 30 secs to 120 secs. The predefined duration may be in the range 45 secs to 105 secs. The predefined duration may be in the range 48 secs to 72 secs (i.e. 1 minute+/−20%). The predefined duration may for example be 1 minute. This time window has an expiry that is extended by detections of activity by the activity sensor 204.

In particular, if the CPU 202 determines at step S508 that the activity sensor 204 has detected activity, then the process 500 loops back to step S506 where the CPU 202 commences the time window again. That is, the time window commences after a last activity detection.

Step S506 may be performed in a number of ways. In one example, at step S506 the CPU 202 may control a counter (not shown in the figures), which may be internal or external to the CPU 202, to start counting. It will be appreciated that this counter may count incrementally or decrementally. In these embodiments, if after the counter has started counting the CPU 202 determines at step S508 that the activity sensor 204 has detected activity, the CPU 202 resets the counter. In another example, at step S506 the CPU 202 may start monitoring a real time clock that always runs and use the real time clock to monitor the time window, e.g. by setting a time associated with the real time clock at which the time window will end.

Upon determining at step S510 the expiry of the time window during which the activity sensor 204 has not detected activity in the environment, the process 500 proceeds to step S512 where the CPU 202 activates the active reflected wave detector 206 so that it is in an activated state and operable to measure wave reflections from the monitored space 104 of the environment 100.

In embodiments whereby prior to step S512 the active reflected wave detector 206 was turned off, step S512 comprises the CPU 202 turning the active reflected wave detector 206 on. In embodiments whereby prior to step S512 the active reflected wave detector 206 was turned on but in a low power consumption operating mode, step S512 comprises the CPU 202 controlling the active reflected wave detector 206 to be in a normal operating mode in which it is operable to perform reflected wave measurements.

As noted above, the active reflected wave detector 206 consumes more power in an activated state (i.e. when turned on and operational) than the activity sensor 204 in an activated state. Thus the process 500 uses a relatively low power consuming activity sensor (e.g. a PIR detector) to determine whether there is activity (e.g. movement) in a monitored space 104 of the environment 100. If no activity is detected for a first predetermined amount of time, then (and only then) the active reflected wave detector 206 is used to determine a status of the environment and/or a person therein.

If activity is no longer detected, either it is because the person has stopped moving enough to be detected by the activity sensor 204 or they can't be seen by the activity sensor (a probable cause of which is that they have left the monitored space 104). The former situation may mean that the person has fallen, alternatively they may be in a non-fall state for example they may be standing and not moving, or they may be safely resting, e.g. on a bed. If the activity sensor 204 started to detect activity (so the person entered the room), but thereafter detected no activity for the first predetermined amount of time, the active reflected wave detector 206 is used to determine if the situation is the former or the latter, i.e. whether they are in the monitored space 104 or not detectable (which is interpreted to mean that they are not in the monitored space 104).

By only activating the active reflected wave detector 206 in the situation when there is potentially a person in the environment in a fall position (i.e. when there has been no activity detections in a time window) less power is consumed and this efficient use of power is particularly advantageous in embodiments where the device 102 is powered by a power source with a limited supply (e.g. a battery).

In embodiments where the activity sensor 204 is used, higher velocities outside the velocity range of the active reflected wave detector 206 (operating at either of the first or second frame rates) would be detected by the activity sensor 204. Thus poor performance of the active reflected wave detector 206 at the higher frame rate (determined at step S404) due to the velocity of the person being outside the velocity range of the active reflected wave detector 206 can be taken as being due to the person's velocity being below the velocity range of the active reflected wave detector 206, rather than above it. Therefore, there is a switching to the lower frame rate performed at step S410.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method comprising:
controlling an active reflected wave detector to measure wave reflections from an environment using a first frame rate to accrue measured wave reflection data for a classifier,
after a first amount of time of accruing measured wave reflection data from the active reflected wave detector, determining whether a predefined criteria based on the measured wave reflection data is satisfied, wherein satisfaction of the predefined criteria is indicative of the classifier being likely to successfully identify a fall status of a person in the environment by a second amount of time of accruing measured wave reflection data from the active reflected wave detector, the second amount of time being greater than the first amount of time;

in the event that the predefined criteria is not met, the method comprising controlling the active reflected wave detector to accrue measured wave reflection data at a lower second frame rate for classifying the fall status based on measured wave reflection data accrued at the lower second frame rate.

2. A non-transitory computer-readable storage medium comprising instructions which, control an active reflected wave detector to measure wave reflections from an environment using a first frame rate to accrue measured wave reflection data for a classifier, after a first amount of time of accruing measured wave reflection data from the active reflected wave detector, determine whether a predefined criteria based on the measured wave reflection data is satisfied, wherein satisfaction of the predefined criteria is indicative of the classifier being likely to successfully identify a fall status of a person in the environment by a second amount of time of accruing measured wave reflection data from the active reflected wave detector, the second amount of time being greater than the first amount of time;

in the event that the predefined criteria is not met, the processor configured to control the active reflected wave detector to accrue measured wave reflection data at a lower second frame rate for classifying the fall status based on measured wave reflection data accrued at the lower second frame rate.

3. A device comprising a processor, wherein the processor is configured to:

control an active reflected wave detector to measure wave reflections from an environment using a first frame rate to accrue measured wave reflection data for a classifier, after a first amount of time of accruing measured wave reflection data from the active reflected wave detector, determine whether a predefined criteria based on the measured wave reflection data is satisfied, wherein satisfaction of the predefined criteria is indicative of the classifier being likely to successfully identify a fall status of a person in the environment by a second amount of time of accruing measured wave reflection data from the active reflected wave detector, the second amount of time being greater than the first amount of time;

in the event that the predefined criteria is not met, the processor configured to control the active reflected wave detector to accrue measured wave reflection data at a lower second frame rate for classifying the fall status based on measured wave reflection data accrued at the lower second frame rate.

4. A device according to claim 3, wherein the device further comprises the active reflected wave detector.

5. A device according to claim 3, wherein the processor is further configured to track an object based on measured wave reflection data accrued at the lower frame rate; and if said tracking does not meet a predefined performance metric by a third amount of time, that is less than the second amount of time, deactivate the active reflected wave detector prior to elapsing of the second amount of time.

6. A device according to claim 5, wherein the processor is further configured to only classify the fall status based on measured wave reflection data if said tracking meets the predefined performance metric.

7. A device according to claim 3, wherein the processor is further configured to classify the fall status based on measured wave reflection data accrued at the lower second frame rate.

8. A device according to claim 7, wherein said classifying is based on measured wave reflection data accrued, in part, during the first amount of time.

9. A device according to claim 3, wherein in the event that the predefined criteria is met, the processor is further configured to maintain the active reflected wave detector to measure wave reflections from the environment using the first frame rate for classifying the fall status based on measured wave reflection data accrued at the first frame rate.

10. A device according to claim 9, wherein the processor is further configured to track an object based on measured wave reflection data accrued at the first frame rate; and if said tracking does not meet a predefined performance metric by a third amount of time, that is less than the second amount of time, deactivate the active reflected wave detector prior to elapsing of the second amount of time.

11. A device according to claim 9, wherein the processor is further configured to classify the fall status based on measured wave reflection data accrued at the first frame rate.

12. A device according to claim 3, wherein the processor is further configured to:

receive an output of an activity sensor to monitor said environment;

commence a time window after the activity sensor detects activity in said environment;

wherein said control of the active reflected wave detector to measure wave reflections from the environment using the first frame rate is performed upon expiry of the time window, wherein the processor is further configured to delay expiry of the time window in response to the activity sensor detecting activity in said environment during the time window.

13. A device according to claim 12, wherein the activity sensor is a motion detector.

14. A device according to claim 13, wherein at the first frame rate the active reflected wave detector is operable to measure wave reflections from a person moving in the environment at a velocity within a velocity range having a lower bound velocity value and an upper bound velocity value, wherein the upper bound velocity value has a magnitude that is greater than a magnitude of a minimum velocity detectable by the motion detector.

15. A device according to claim 12, wherein the device further comprises the activity sensor.

16. A device according to claim 3, wherein the predefined criteria is that a tracking algorithm is able to track a potentially human object based on the measured wave reflection data with said tracking meeting a predefined performance metric.

17. A device according to claim 3, wherein the predefined criteria relates to a predefined metric derived from the measured wave reflection data.

18. A device according to claim 17, wherein the predefined metric derived from the measured wave reflection data is, or is based on, at least one count of measured wave reflections accrued during the first amount of time.

19. A device according to claim 3, wherein the measured wave reflection data represents reflections only from moving reflection points in the environment.

20. A device according to claim 3, wherein the active reflected wave detector is a radar sensor.

\* \* \* \* \*